United States Patent
Gallagher

(10) Patent No.: US 12,291,998 B2
(45) Date of Patent: May 6, 2025

(54) HYBRID POWER SYSTEM WITH INDIVIDUALIZED COMPONENT LUBRICATION AND METHOD FOR OPERATING THE SAME

(71) Applicant: Raytheon Technologies Corporation, Farmington, CT (US)

(72) Inventor: Adam Gallagher, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 124 days.

(21) Appl. No.: 18/114,656

(22) Filed: Feb. 27, 2023

(65) Prior Publication Data

US 2024/0287933 A1    Aug. 29, 2024

(51) Int. Cl.
  *F02C 7/06*  (2006.01)
  *B64D 27/10*  (2006.01)
  *B64D 27/24*  (2006.01)
  *F02C 7/32*  (2006.01)

(52) U.S. Cl.
  CPC .............. *F02C 7/06* (2013.01); *B64D 27/10* (2013.01); *B64D 27/24* (2013.01); *F02C 7/32* (2013.01); *F05D 2220/323* (2013.01); *F05D 2220/76* (2013.01); *F05D 2260/98* (2013.01)

(58) Field of Classification Search
  CPC ....... F02C 7/06; B64D 27/10; F05D 2260/98; F05D 2220/76
  See application file for complete search history.

(56) References Cited

U.S. PATENT DOCUMENTS

| | | | | |
|---|---|---|---|---|
| 7,621,117 B2* | 11/2009 | Dooley | ................... | F01D 19/00 60/793 |
| 7,793,505 B2* | 9/2010 | Dooley | ................... | F01D 19/00 60/778 |
| 10,348,162 B1* | 7/2019 | Huang | ...................... | F02C 7/12 |
| 10,371,007 B2* | 8/2019 | Cigal | ...................... | F01D 25/20 |
| 10,634,053 B2* | 4/2020 | Schwarz | ............ | F16H 57/0471 |
| 11,386,213 B2* | 7/2022 | Gallagher | ........... | G06F 9/45545 |
| 11,781,481 B2* | 10/2023 | Winter | ...................... | F02C 7/32 60/772 |

(Continued)

OTHER PUBLICATIONS

EP Search Report for EP Patent Application No. 24159954.7 dated Jun. 25, 2024.

*Primary Examiner* — Michael A Riegelman
(74) *Attorney, Agent, or Firm* — Getz Balich LLC

(57) ABSTRACT

A hybrid electric propulsion system is provided that includes a thermal engine, at least one electric generator, at least one lubrication fluid pump, at least one electric motor, and a controller. The electric generator is driven by the thermal engine, and is configured to produce electrical power. The lubrication fluid pump is configured to provide a volumetric flow rate of lubrication fluid to at least one component of the thermal engine. The electric motor is configured to drive the lubrication fluid pump using electrical power from the electric generator. The controller is in communication with the electric motor and a memory device storing instructions, which instructions when executed cause the controller to control the electric motor to drive the lubrication fluid pump to produce lubrication fluid at a determined volumetric fluid flow rate to the at least one component of the thermal engine.

17 Claims, 4 Drawing Sheets

(56) References Cited

U.S. PATENT DOCUMENTS

| | | | |
|---|---|---|---|
| 11,977,650 B2* | 5/2024 | Gallagher | G06F 9/45545 |
| 2016/0160714 A1* | 6/2016 | James | F02C 7/32 |
| | | | 60/39.08 |
| 2016/0258324 A1* | 9/2016 | Cigal | F01D 21/00 |
| 2017/0175874 A1* | 6/2017 | Schwarz | F16H 57/0479 |
| 2017/0211477 A1* | 7/2017 | Menheere | F02C 7/32 |
| 2017/0364693 A1* | 12/2017 | Gallagher | G06F 21/6209 |
| 2019/0199169 A1* | 6/2019 | Huang | F02C 7/06 |
| 2019/0323597 A1* | 10/2019 | Sheridan | F01D 19/00 |
| 2022/0042465 A1* | 2/2022 | Swann | F02C 6/00 |
| 2022/0349466 A1* | 11/2022 | Gaully | F16H 57/0435 |
| 2022/0366065 A1* | 11/2022 | Gallagher | G06F 9/45545 |
| 2022/0397060 A1* | 12/2022 | Winter | F02C 7/06 |
| 2023/0387750 A1* | 11/2023 | Gover | F01D 15/10 |
| 2023/0417180 A1* | 12/2023 | Klonowski | F01D 15/10 |
| 2024/0052789 A1* | 2/2024 | Dautreppe | F01D 15/10 |

* cited by examiner

HYBRID POWER SYSTEM WITH INDIVIDUALIZED COMPONENT LUBRICATION AND METHOD FOR OPERATING THE SAME

BACKGROUND OF THE INVENTION

1. Technical Field

The present disclosure relates generally to hybrid power systems with a thermal engine and an electric generator in general, and to lubrication systems for the same in particular.

2. Background Information

Hybrid electric aircraft propulsion systems combine thermal engine and electric power very often for propulsion purposes. In an electric propulsion system, electrical energy is converted to rotational energy by an electric motor to drive a propulsion fan or a propeller. Virtually all thermal engines require a lubrication system for lubricating components and for heat transfer purposes. As an example, conventional gas turbine engines very often include a lubrication pump driven by a gearbox portion of the engine. The pump draws lubrication fluid from a reservoir and provides it to components such as bearings. A scavenge pump recovers the lubrication fluid and typically passes the lubrication fluid through a deaerator before returning the fluid to the reservoir. The lubrication pump in these types of systems are often mechanically linked to the rotational speed of an engine shaft. This mechanical linkage between lubrication pump and engine shaft imposes some limitations on the lubrication flow within the gas turbine engine.

What is needed is a lubrication system and method that can be used with a hybrid engine system that is an improvement over existing systems and methods.

SUMMARY

According to an aspect of the present disclosure, a hybrid electric propulsion system is provided that includes a thermal engine, at least one electric generator, at least one lubrication fluid pump, at least one electric motor, and a controller. The at least one electric generator is driven by the thermal engine, and is configured to produce electrical power. The at least one lubrication fluid pump is configured to provide lubrication fluid at a volumetric flow rate to at least one component of the thermal engine. The at least one electric motor is configured to drive the at least one lubrication fluid pump using electrical power from the at least one electric generator. The controller is in communication with the at least one electric motor and a memory device storing instructions, which instructions when executed cause the controller to control the at least one electric motor to drive the at least one lubrication fluid pump to produce lubrication fluid at a volumetric fluid flow rate to the at least one component of the thermal engine.

In any of the aspects or embodiments described above and herein, the at least one lubrication fluid pump may include a first lubrication fluid pump and a second lubrication fluid pump, and the at least one electric motor may include a first electric motor and a second electric motor, and the at least one component of the thermal engine may include a first component of the thermal engine and a second component of the thermal engine, and the first lubrication fluid pump may be driven by the first electric motor, and the second lubrication fluid pump may be driven by the second electric motor, and the instructions when executed may cause the controller to control the first electric motor to drive the first lubrication fluid pump to produce lubrication fluid at a first volumetric fluid flow rate to the first component of the thermal engine, and cause the controller to control the second electric motor to drive the second lubrication fluid pump to produce lubrication fluid at a second volumetric fluid flow rate to the second component of the thermal engine.

In any of the aspects or embodiments described above and herein, the first volumetric fluid flow rate may be greater than the second volumetric fluid flow rate.

In any of the aspects or embodiments described above and herein, the first volumetric fluid flow rate may be at a first pressure and the second volumetric fluid flow rate may be at a second pressure, and the first pressure may be greater than the second pressure.

In any of the aspects or embodiments described above and herein, the thermal engine may be a gas turbine engine having a low speed shaft and a high speed shaft, and the first component of the thermal engine may be one or more bearings supporting the low speed shaft and the second component of the thermal engine may be one or more bearings supporting the high speed shaft.

In any of the aspects or embodiments described above and herein, the first volumetric fluid flow rate may be different than the second volumetric fluid flow rate.

In any of the aspects or embodiments described above and herein, the first volumetric fluid flow rate may be at a first pressure and the second volumetric fluid flow rate may be at a second pressure, and the first pressure may be different than the second pressure.

In any of the aspects or embodiments described above and herein, the instructions when executed may cause the controller to control the first electric motor to drive the first lubrication fluid pump to adjust the first volumetric fluid flow rate to the first component of the thermal engine during operation of the thermal engine, or to control the second electric motor to drive the second lubrication fluid pump to adjust the second volumetric fluid flow rate to the second component of the thermal engine during operation of the thermal engine, or both.

In any of the aspects or embodiments described above and herein, the thermal engine may be a gas turbine engine powering an aircraft.

In any of the aspects or embodiments described above and herein, the thermal engine may be a gas turbine engine, and the at least one lubrication fluid pump may include a scavenge pump configured to recover lubrication fluid from the at least one component of the thermal engine, and the at least one electric motor may include a first electric motor configured to drive the scavenge pump using electrical power from the at least one electric generator, and the instructions when executed cause the controller to control the first electric motor to drive the scavenge pump to recover lubrication fluid from the at least one component of the thermal engine.

In any of the aspects or embodiments described above and herein, the at least one lubrication fluid pump may include a first lubrication fluid pump, a second lubrication fluid pump, and a scavenge pump, and the at least one electric motor may include a first electric motor, a second electric motor, and a third electric motor, and the at least one component of the thermal engine may include a first component of the thermal engine and a second component of the thermal engine, and the first lubrication fluid pump may be driven by the first electric motor, and the second lubrication fluid pump may be driven by the second electric motor, and the scavenge pump may be driven by the third electric motor, and the instructions when executed may cause the controller to control the first electric motor to drive the first lubrication fluid pump to produce lubrication fluid at a first volumetric fluid flow rate to the first component of the thermal engine, and may cause the controller to control the second electric motor to drive the second lubrication fluid pump to produce lubrication fluid at a second volumetric fluid flow rate to the second component of the thermal engine, and may cause the controller to control the third electric motor to recover lubrication fluid from the first component and the second component.

According to another aspect of the present disclosure, an aircraft is provided that includes at least one hybrid electric propulsion system. The hybrid electric propulsion system includes a thermal engine, at least one electric generator, at least one lubrication fluid pump, at least one electric motor, and a controller. The at least one electric generator is driven by the thermal engine, and is configured to produce electrical power. The at least one lubrication fluid pump is configured to provide lubrication fluid at a volumetric flow rate to at least one component of the thermal engine. The at least one electric motor configured to drive the at least one lubrication fluid pump using electrical power from the at least one electric generator. The controller is in communication with the at least one electric motor and a memory device storing instructions, which instructions when executed cause the controller to control the at least one electric motor to drive the at least one lubrication fluid pump to produce lubrication fluid at a volumetric fluid flow rate to the at least one component of the thermal engine.

According to another aspect of the present disclosure, a method of operating an aircraft hybrid electric propulsion system is provided that includes driving at least one electric generator to produce electrical power using a thermal engine, using a controller to control a first electric motor powered by the electrical power to drive a first lubrication fluid pump to produce a first volumetric flow rate of lubrication fluid to a first component of the thermal engine, and using the controller to control a second electric motor powered by the electrical power to drive a second lubrication fluid pump to produce a second volumetric flow rate of lubrication fluid to a second component of the thermal engine.

In any of the aspects or embodiments described above and herein, wherein the thermal engine is a gas turbine engine, and the method may further include using the controller to control a third electric motor powered by the electrical power to drive a scavenge pump to recover said lubrication fluid from the first component of the thermal engine, or from the second component of the thermal engine, or both.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to a hybrid electric propulsion system, a lubrication system for the same, an aircraft having a hybrid electric propulsion system, and a method for lubricating a hybrid electric propulsion system. As will be described herein, aspects of the present disclosure system includes a thermal engine, one or more electric generators, one or more electric motors, and a lubrication system powered by the one or more electric motors. In some examples, embodiments of the present disclosure may include one or more controllers in communication with other system components.

A gas turbine engine is a nonlimiting example of a thermal engine that may be a component within a present disclosure system. The present disclosure may utilize a variety of different gas turbine engine configurations (e.g., turbofan, turboshaft, non-geared engines, and the like).

Figure 1:
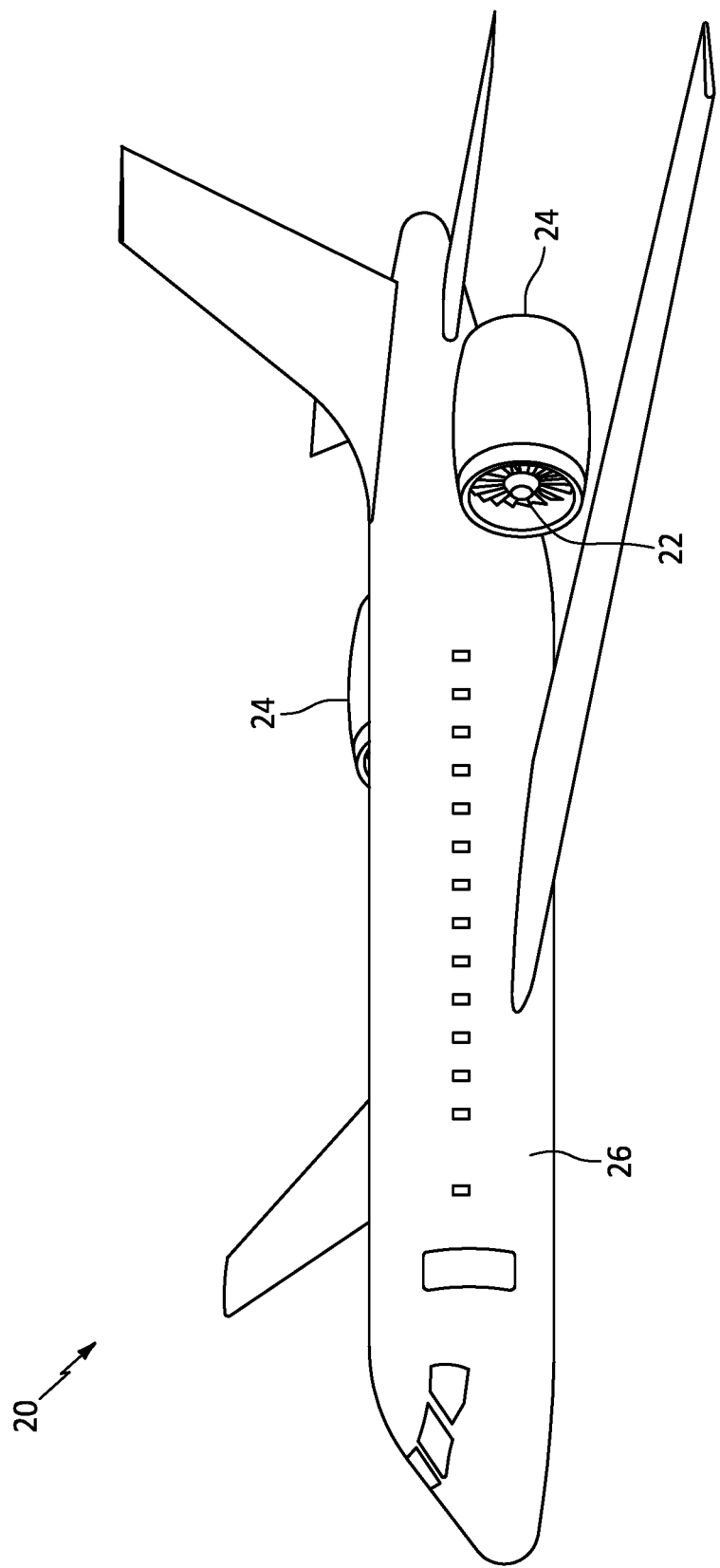
FIG. 1 is a diagrammatic perspective view of an aircraft having a present disclosure hybrid electric propulsion system.

FIG. 1 illustrates an aircraft 20 that may be powered by one or more hybrid propulsion systems 22 as described herein. The aircraft 20 shown in FIG. 1 includes a pair of hybrid propulsion systems 22, each disposed in a nacelle 24 that is attached to the fuselage 26 of the aircraft. The present disclosure is not limited to any particular aircraft 20 configuration.

Figure 2:
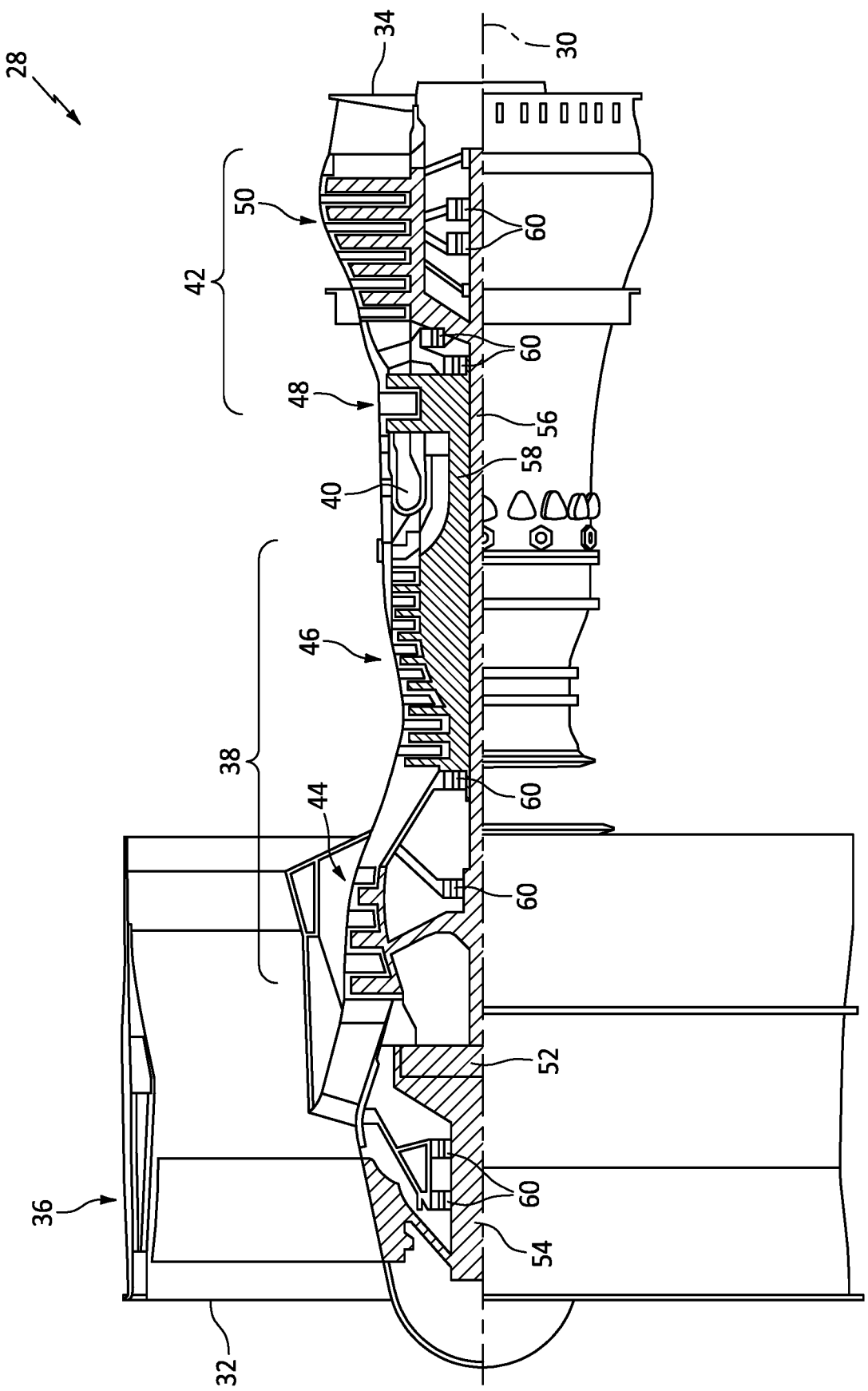
FIG. 2 is a diagrammatic cross-sectional view of a gas turbine engine.

FIG. 2 shows a partially sectioned diagrammatic view of a geared gas turbine engine 28 that is a nonlimiting example of a thermal engine that may be used in a present disclosure system. The gas turbine engine 28 extends along an axial centerline 30 between an upstream airflow inlet 32 and a downstream airflow exhaust 34. The gas turbine engine 28 includes a fan section 36, a compressor section 38, a combustor section 40, and a turbine section 42. The compressor section 38 includes a low pressure compressor (LPC) 44 and a high pressure compressor (HPC) 46. The turbine section 42 includes a high pressure turbine (HPT) 48 and a low pressure turbine (LPT) 50. The engine sections 26, 44, 46, 48, 50 are arranged sequentially along the centerline 30 within an engine housing.

The fan section 36 is connected to a gear train 52, for example, through a fan shaft 54. The gear train 52 and the LPC 44 are connected to and driven by the LPT 50 through a low speed shaft 56. The HPC 46 is connected to and driven by the HPT 48 through a high speed shaft 58. The shafts 56, 58 are rotatably supported by a plurality of bearings 60; e.g., rolling element bearings, thrust bearings, and the like. Each of these bearings 60 is connected to the engine housing by at least one stationary structure such as, for example, an annular support strut. The engine 28 includes a lubrication system (not shown in FIG. 2) that provides lubrication fluid (e.g., oil) to each of the bearings 60 and in some cases other engine components as well. The lubrication fluid both lubricates and cools the bearings 60. In some conventional gas turbine engines, a lubrication pump driven by the engine draws lubrication fluid from a reservoir and provides the lubrication fluid to the bearings (and other components). A scavenge pump recovers the lubrication fluid from the bearings/components and typically passes the lubrication fluid through a deaerator. After passing through the deaerator, the lubrication fluid is passed back into the reservoir and the cycle repeats itself. In some embodiments, a lubrication system may include one or more heat exchangers to transfer heat from the lubrication fluid; e.g., a fuel/engine oil heat exchanger. Lubrication fluids used within thermal engines, including gas turbine engines, are well known and the present disclosure is not limited to any particular type of lubrication fluid.

During operation, air enters the gas turbine engine 28 through the airflow inlet 32 and is directed through the fan section 36 and into a core gas path or a bypass gas path. The air within the core gas path may be referred to as "core air". The air within the bypass gas path may be referred to as "bypass air". The core air is directed through the engine sections 38, 40, 42, and exits the gas turbine engine 28 through the airflow exhaust 34 to provide forward engine thrust. Within the combustor section 40, fuel is injected into a combustion chamber and mixed with compressed core air. This fuel-core air mixture is ignited to power the gas turbine engine. The bypass air is directed through the bypass gas path and out of the turbine engine through a bypass nozzle to provide additional forward engine thrust.

Figure 3:
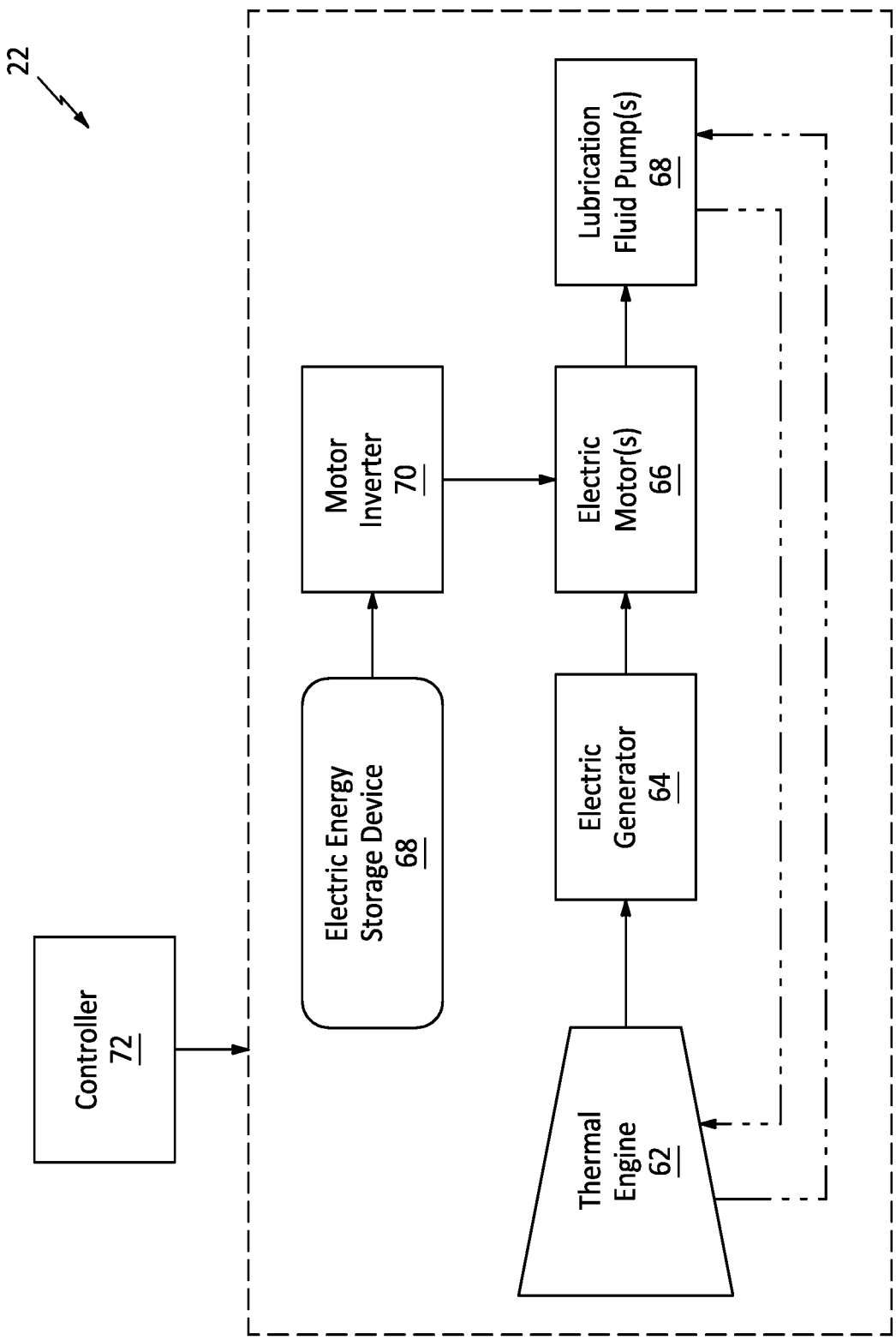
FIG. 3 is a diagram of a present disclosure hybrid electric propulsion system embodiment.

FIG. 3 diagrammatically illustrates an example embodiment of a present disclosure hybrid electric propulsion system 22 that includes a thermal engine 62, at least one electric generator 64, at least one electric motor 66, and a lubrication system 68 having at least one lubrication fluid pump. In some embodiments, the at least one lubrication fluid pump may include a "feed" lubrication fluid pump and a return (or "scavenge") lubrication fluid pump (e.g., see FIG. 4). In the system diagrammatically shown in FIG. 3, the thermal engine 62 drives the electric generator 64. The electric generator 64, in turn, produces electric power in the form of alternating current (AC). The AC electric power is used to power the electric motor 66. This system 22 embodiment may be described as an AC-AC architecture where alternating current (AC) electric power is generated by the generator 64 and that electric power is used to drive the electric motor 66. The present disclosure is not limited to an AC-AC architecture. For example, in alternative embodiments, the system 22 may comprise an AC-DC-AC architecture, wherein the generated AC electric power is converted to direct current (DC) and then reconverted to AC electric power to drive the electric motor 66. The present disclosure is not limited to any particular hybrid electric propulsion system power architecture. Although the system 22 diagram shown in FIG. 3 shows a single electric generator 64 and a single electric motor 66, a present disclosure system 22 may include a plurality of electric generators 64, or a plurality of electric motors 66, or any combination thereof. The thermal engine 62 is operatively coupled to the at least one generator 64 in a manner that permits the generator 64 to be driven by the thermal engine 62; e.g., via a gearbox (not shown).

As shown in FIG. 3, the hybrid electric propulsion system 22 may in some embodiments be configured to store and use stored electrical energy; e.g., electrical energy may be stored in and withdrawn from an electrical energy storage device 68 such as a battery. In these embodiments, the system 22 may include an inverter 70 that converts AC electric power for storage and converts DC power into AC power for use by the electric motor 66. The inverter 70 receives direct current (DC) electric power from the battery (or another direct current source) and converts the DC voltage to AC voltage whose frequency and phase is adjusted to enable the electric motor 66 to generate mechanical power. In some embodiments, the inverter 70 can also be used conversely to charge the battery, making the electric motor 66 operate as a generator, in which condition the inverter 70 can convert AC voltage back into DC voltage. The present disclosure system 22 may utilize electrical energy storage 68 types other than a battery. The present disclosure system 22 does not require the use of an electrical energy storage device 68.

In some embodiments, the system 22 may be configured so that the inverter 70 may be used to recover from or prevent desynchronization of the electric generator 64 and the electric motor 66. When used for recovery of desynchronization, the inverter 70 may resynchronize the frequency of the electric motor 66 to the frequency of the electric generator 64, in response to a command or control signal received from a controller 72, or in response to logic implemented in the inverter 70 which monitors and seeks to control the frequency and phasing of the electric generator 64 and electric motor 66. During resynchronization, the controller 72 may temporarily disconnect the electric generator 64 from the electric motor 66, for example by opening a relay therebetween. The inverter 70 may then adjust the power to the electric motor 66 so that the speed of the electric motor 66 is modified in such a way to match the frequency of the electric motor 66 to the frequency of the electric generator 64. The electric motor 66 and the electric generator 64 can then be brought back in phase with each other. Once the electric motor 66 is back in phase with the electric generator 64, the connection between the electric generator 64 and the electric motor 66 is restored. When used for prevention of desynchronization, the inverter 70 may actively monitor the phase of the electric motor 66. Upon detection of a mismatch in phase between the electric generator 64 and the electric motor 66, the inverter 70 may send an electric signal that is in-phase with the electric motor 66, to provide additional power to bring the electric motor 66 back in phase with the electric generator 64. This feature may be put into effect by the controller 72 or it can be incorporated in the inverter 70.

In some embodiments, the present disclosure system 22 may be configured with additional electrical energy producing devices such as an auxiliary power unit, a supplementary power unit, or the like. Each of these additional power units may be configured with an electrical generator to produce AC electrical power.

In those system embodiments that include one or more controllers 72, the controller 72 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 22 to accomplish the same algorithmically and/or coordination of system components. The controller 72 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller 72 and other system components may be via a hardwire connection.

In the system embodiment diagrammatically shown in FIG. 3, the electric motor 66 has a first input in communication with the electric generator 64 to receive a first source of AC electric power from the electric generator 64, and a second input operatively coupled to the inverter 70 to receive a second source of AC electric power from the inverter 70. Note that the electric motor 66 does not need to have two independent inputs (i.e., one from the generator 64 and one from the inverter 70). The output of the generator 64 and the output of the inverter 70 may be combined or connected in parallel before a motor input interface. The electric motor 66 will, in response to receiving either one of the first source of AC electric power and the second source of AC electric power (or both simultaneously), generate a rotating output for driving the lubrication fluid pump. The controller 72 may be configured for selectively driving the electric motor 66 using the first source of AC electric power from the generator 64, the second source of AC electric power from the inverter 70, or a combination thereof. When AC electric power is received concurrently from both the generator 64 and the inverter 70, a greater amount of power is available to the electric motor 66.

As stated above, a gas turbine engine includes a lubrication system that provides lubrication fluid (e.g., oil) to various components within the engine; e.g., high speed shaft bearings, low speed shaft bearings, gearbox bearings, accessory drives, propeller shaft bearings, and the like. The lubrication system includes at least one lubrication fluid pump. Conventional gas turbine engines typically have a lubrication fluid pump that is mechanically driven off of a gearbox which is in turn driven by the high speed or low speed shaft. As a result, the rotational speed of the lubrication fluid pump is typically dictated by the rotational speed of an engine shaft. A person of skill in the art will recognize that the lubrication fluid requirements of different components (e.g., different bearings) can vary significantly based on the particular needs of the component. In addition, the lubrication fluid requirements of a given engine component can vary as a function of the operational mode of the engine; e.g., lubrication fluid requirements under take-off conditions for a given component may be different than the lubrication fluid requirements for the same component under cruise conditions. Conventional gas turbine engine lubrication systems often address the different component lubrication fluid requirements by using fluid flow control devices (e.g., calibrated orifices, nozzles, valving, and the like), but the component fluid flow parameters of the lubrication system are all based on the fluid flow parameters dictated by the lubrication fluid pump and the rotational speed tied to engine shaft rotational speed. Bearings serviced by the lubrication system are often disposed in a bearing compartment that contains the lubrication fluid for those bearings. In conventional gas turbine engines, it is not uncommon for a bearing compartment to have excess lubrication fluid (i.e., a "gulp" condition) or have an amount of lubrication fluid less than desirable (i.e., a "starvation" condition).

Embodiments of the present disclosure hybrid system, in contrast, may utilize a single controllable electric motor to drive a lubrication fluid pump configured to provide lubrication to all of the engine components requiring a lubrication fluid. Other embodiments of the present disclosure hybrid system may utilize a plurality of coupled controllable electric motors and lubrication fluid pumps. In these embodiments, a controllable electric motor and a lubrication fluid pump pair may be dedicated to providing lubrication to a single engine component; e.g., if the engine has "N" number of components that require lubrication fluid, then the system may include "N" number of motor/pump pairs, where "N" is an integer greater than one (1). Other embodiments of the present disclosure hybrid system may utilize a motor/pump pair to satisfy the lubrication fluid requirements of an individual engine component, and other motor/pump pairs to satisfy the lubrication fluid requirements of more than one engine component; e.g., a first motor/pump pair to satisfy the lubrication fluid requirements of component A, a second motor/pump pair to satisfy the lubrication fluid requirements of component B, a third motor/pump pair to satisfy the lubrication fluid requirements of components C, D, and E, and so on. In those instances wherein a motor/pump pair is used to satisfy the lubrication fluid requirements of more than one engine component, the components serviced by the motor/pump pair may, but are not required to, have similar lubrication fluid requirements. Embodiments of the present disclosure may also include one or more electric motor/scavenge pump pairs for recovering lubrication fluid from the components. In some embodiments, a single electric motor/scavenge pump pair may be used to recover lubrication fluid from all of the components receiving lubrication fluid. In some embodiments, a plurality of electric motor/scavenge pump pairs may be used to recover lubrication fluid from components receiving lubrication fluid; e.g., a first electric motor/scavenge pump pair dedicated to recovering lubrication fluid from a first component, a second electric motor/scavenge pump pair dedicated to recovering lubrication fluid from a second component and a third component, and the like. The latter embodiment permits the electric motor/scavenge pump pair to be tailored to the recovery needs of the respective component(s) with which they are associated.

Figure 4:
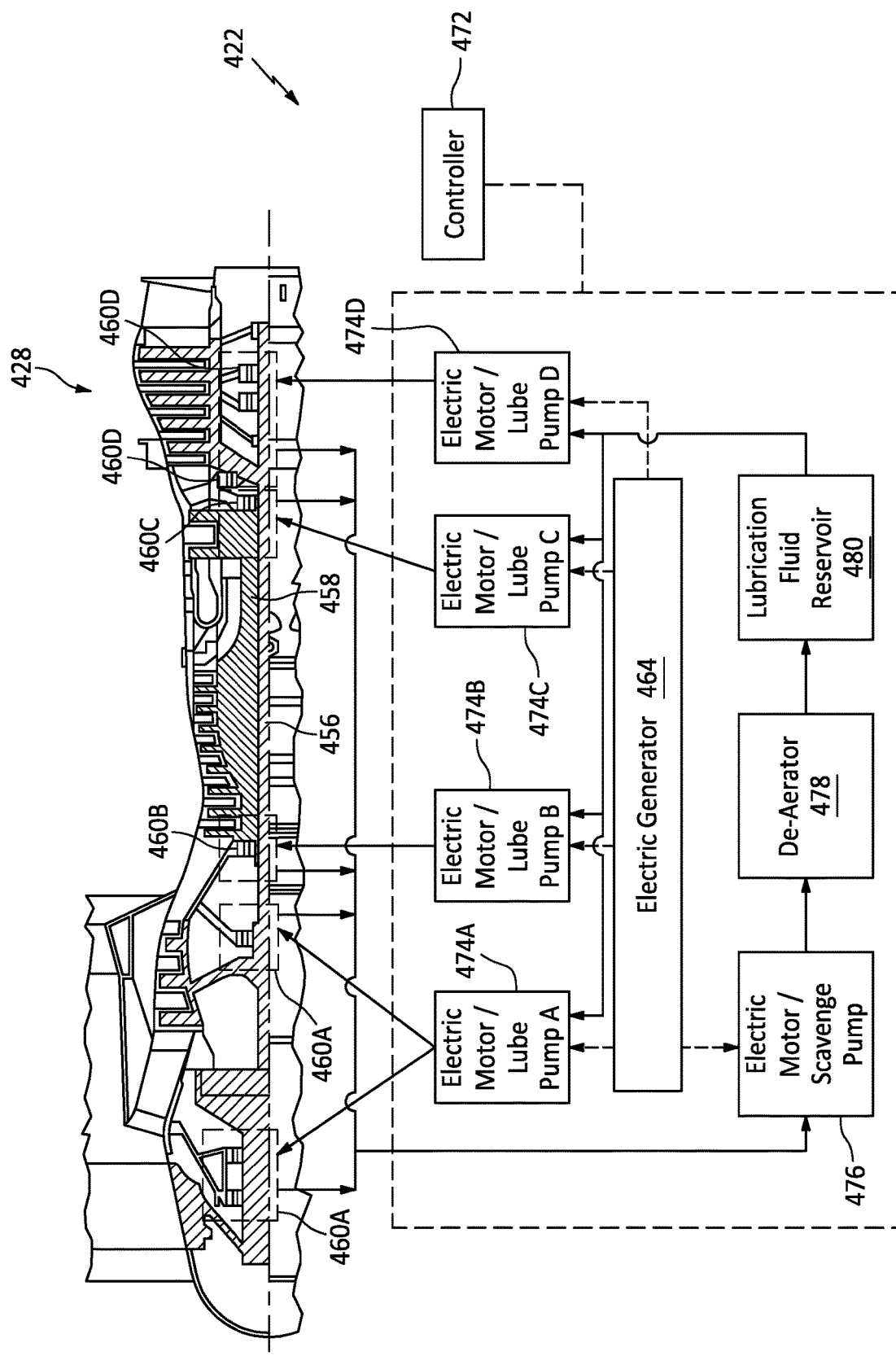
FIG. 4 is a diagram of a present disclosure hybrid electric propulsion system embodiment illustrated with a cross-sectional view of an exemplary gas turbine engine.

FIG. 4 diagrammatically illustrates an example of a present disclosure hybrid electric propulsion system 422 using the gas turbine engine 428 shown in FIG. 2 as the thermal engine. This system 422 example includes an electric generator 464, electric motor/lubrication pump pairs A-D 474A, 474B, 474C, 474D, an electric motor/scavenge pump pair 476, a deaerator 478, a lubrication fluid reservoir 480, and a controller 472. The electric generator 464 is driven by the gas turbine engine 428 (e.g., the generator 464 may be coupled to a gearbox driven by a motor shaft). The electric generator 464 is configured to produce sufficient AC electric power to power the electric motor/lubrication pump pairs 474A-D and the electric motor/scavenge pump pair 476. The controller 472 is in signal communication with the electric motor/lubrication pump pairs 474A-D and the electric motor/scavenge pump pair 476. In alternative embodiments, the scavenge pump may be mechanically powered off the gas turbine engine 428 (e.g., via the gearbox), or alternatively the system 422 may include more than one electric motor/scavenge pump pair 476. The present disclosure system is also not limited to having a single lubricant fluid reservoir 480 and/or deaerator 478.

During operation of the hybrid electric propulsion system 422, the gas turbine engine 428 is used to power the generator 464. The generator 464 in turn produces enough AC electrical energy to drive the electric motor/lubrication pump pairs 474A-D and the electric motor/scavenge pump pair 476. The motor/pump pairs 474A-D draw lubrication fluid from the lubrication fluid reservoir 480 and provide the lubrication fluid to the respective engine components. The lubrication fluid is recovered from each component by the electric motor/scavenge pump pair 476. The motor/scavenge pump pair 476 subsequently passes the recovered lubrication fluid through the deaerator 478. As stated above, in some instances, the recovered oil may also pass through a heat exchanger and may pass through filtration devices. The recovered oil is then returned to the lubrication fluid reservoir 480 and the cycle repeats itself.

Each of the electric motor/lubrication pump pairs 474A-D is configured to provide lubrication fluid flow at parameters (e.g., volumetric fluid flow rate and pressure) sufficient for a component under the expected operating conditions of the engine 428. For example, motor/pump pair 474A is configured to provide lubrication fluid flow parameters sufficient for the forward bearings of the low speed shaft 456 of the engine 428. Motor/pump pair 474B is configured to provide lubrication fluid flow parameters sufficient for the forward bearing 460B of the high speed shaft 458 of the engine 428. Motor/pump pair 474C is configured to provide lubrication fluid flow parameters sufficient for the aft bearings 460C of the high speed shaft 458 of the engine 428. Motor/pump pair 474D is configured to provide lubrication fluid flow parameters sufficient for the aft bearings 460D of the low speed shaft 456 of the engine 428. The operation of each electric motor/lubrication pump pair 474A-D is not dictated by the rotational speed of an engine shaft 456, 458. More specifically, the control of each electric motor/lubrication pump pair 474A-D may take into consideration an engine shaft speed, but the control is not dictated by the engine shaft speed. Each motor/pump pair 474A-D is specifically configured (and can be controlled) to provide the desired lubrication fluid flow at parameters for the respective component and operating conditions of the engine 428.

During operation of the thermal engine (e.g., the gas turbine engine 428) engine operating parameters will vary depending, for example, on the segment of the flight; e.g., take-off, cruise, landing, and the like. In addition to engine operating conditions varying, the lubrication fluid requirements may also vary from component to component. For example, under a given flight condition a first component may require increased lubricant fluid flow while at the same time a lesser lubricant fluid flow may be sufficient for another engine component. Hence, the present disclosure hybrid electric propulsion system 22, 422 permits lubricant fluid flow parameters to be tailored for each engine component.

As yet another example of the utility of the present disclosure, a present disclosure hybrid electric propulsion system that includes an electrical energy storage device 68 (e.g., a battery) or have an alternative source of power to drive the generator 64 (e.g., an auxiliary power unit) and therefore a respective motor/pump pair, may be controlled to cycle lubrication fluid through a component prior to the gas turbine engine being operated.

The ability of the present disclosure system to tailor lubrication fluid flow to respective engine components not only ensures that components get their requisite lubrication fluid flow, but also facilitates control of scavenge flow. The tailored lubricant fluid flow to and from engine components helps to avoid excessive lubrication fluid flow and thereby helps to avoid "gulp" conditions wherein a component compartment is overfilled with lubricant fluid. For example, the present disclosure system may include one or more sensors configured to sense operating parameters of a component (e.g., a shaft bearing) and one or more sensors configured to sense operating parameters of a component compartment (e.g., a bearing compartment). Regarding the former, the component sensors may provide information that relates to the adequacy of the lubrication fluid being supplied to the component; e.g., one or more temperature sensors disposed to sense the temperature of a bearing, or a load sensor configured to sense a load (e.g., radial or thrust) on a bearing, or a volumetric flowrate sensor sensing the flow rate of lubrication fluid entering the component compartment, or the like. Sensor input relating to the adequacy of the lubrication fluid being supplied to the component may be supplied to the controller 72, 472. The controller 72, 472 in response may act (via executable stored instructions) to alter the operation of the motor/pump pair supplying lubrication fluid to that component to produce any change in lubrication fluid supply that may be warranted. Regarding the latter, the compartment sensors may provide information that relates to the level of lubrication fluid present within the component compartment; e.g., a plurality of sensors configured to sense the presence of lubrication fluid at various positions within the component compartment, where the presence of lubrication fluid at various positions within the component compartment indicates the amount of lubrication fluid in the compartment. Sensor input relating to the amount of lubrication fluid present in the compartment may be supplied to the controller 72, 472. The controller 72, 472 in response may act (via executable stored instructions) to alter the operation of the motor/pump pair supplying lubrication fluid to that component, and/or to alter the operation of the motor/scavenge pump pair recovering lubrication fluid to that compartment; e.g., a sensed excess of lubrication fluid within a component compartment may be addressed by increasing the volumetric rate of lubrication fluid recovered from the compartment via the motor/scavenge pump pair until the lubrication fluid level within the compartment is acceptable.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f)

unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A hybrid electric propulsion system, comprising:
a thermal engine;
an electric generator driven by the thermal engine, and configured to produce electrical power;
a lubrication fluid pump configured to provide a lubrication fluid at a volumetric fluid flow rate to a component of the thermal engine;
an electric motor configured to drive the lubrication fluid pump using said electrical power from the electric generator; and
a controller in communication with the electric motor and a memory device storing instructions, which instructions when executed cause the controller to control the electric motor to drive the lubrication fluid pump to produce said lubrication fluid at said volumetric fluid flow rate to the component of the thermal engine, wherein:
the thermal engine is a gas turbine engine;
the lubrication fluid pump includes a scavenge pump configured to recover said lubrication fluid from the component of the thermal engine;
the electric motor includes a first electric motor configured to drive the scavenge pump using said electrical power from the electric generator; and
the instructions when executed cause the controller to control the first electric motor to drive the scavenge pump to recover said lubrication fluid from the component of the thermal engine.

2. The system of claim 1, wherein the lubrication fluid pump further includes a first lubrication fluid pump and a second lubrication fluid pump; and
the electric motor further includes a first second electric motor and a third electric motor; and
the component of the thermal engine includes a first component of the thermal engine and a second component of the thermal engine;
wherein the first lubrication fluid pump is driven by the first second electric motor; and
wherein the second lubrication fluid pump is driven by the second third electric motor; and
wherein the instructions when executed further cause the controller to control the second electric motor to drive the first lubrication fluid pump to produce said lubrication fluid at a first volumetric fluid flow rate to the first component of the thermal engine, and cause the controller to control the third electric motor to drive the second lubrication fluid pump to produce said lubrication fluid at a second volumetric fluid flow rate to the second component of the thermal engine.

3. The system of claim 2, wherein the first volumetric fluid flow rate is greater than the second volumetric fluid flow rate.

4. The system of claim 2, wherein the first volumetric fluid flow rate is at a first pressure and the second volumetric fluid flow rate is at a second pressure, and the first pressure is greater than the second pressure.

5. The system of claim 2, wherein the thermal engine has a low speed shaft and a high speed shaft, and the first component of the thermal engine is one or more bearings supporting the low speed shaft and the second component of the thermal engine is one or more bearings supporting the high speed shaft.

6. The system of claim 5, wherein the first volumetric fluid flow rate is different than the second volumetric fluid flow rate.

7. The system of claim 5, wherein the first volumetric fluid flow rate is at a first pressure and the second volumetric fluid flow rate is at a second pressure, and the first pressure is different than the second pressure.

8. The system of claim 2, wherein the instructions when executed cause the controller to control the second electric motor to drive the first lubrication fluid pump to adjust the first volumetric fluid flow rate to the first component of the thermal engine during operation of the thermal engine, or to control the third electric motor to drive the second lubrication fluid pump to adjust the second volumetric fluid flow rate to the second component of the thermal engine during operation of the thermal engine, or both.

9. The system of claim 1, wherein the gas turbine engine is an aircraft gas turbine engine.

10. The system of claim 1, wherein the lubrication fluid pump further includes a first lubrication fluid pump, and a second lubrication fluid pump; and
the electric motor further includes a second electric motor, and a third electric motor; and
the component of the thermal engine includes a first component of the thermal engine and a second component of the thermal engine;

wherein the first lubrication fluid pump is driven by the second electric motor, and the second lubrication fluid pump is driven by the third electric motor; and wherein the instructions when executed further cause the controller to control the second electric motor to drive the first lubrication fluid pump to produce said lubrication fluid at a first volumetric fluid flow rate to the first component of the thermal engine, and cause the controller to control the third electric motor to drive the second lubrication fluid pump to produce said lubrication fluid at a second volumetric fluid flow rate to the second component of the thermal engine, and cause the controller to control the first electric motor to recover said lubrication fluid from the first component and the second component.

11. An aircraft, comprising:
at least one hybrid electric propulsion system, that includes:
a thermal engine;
an electric generator driven by the thermal engine, and configured to produce electrical power;
a lubrication fluid pump comprising a first lubrication fluid pump configured to provide a first lubrication fluid at a first volumetric fluid flow rate to a first component of the thermal engine, and a second lubrication fluid pump configured to provide a second lubrication fluid at a second volumetric fluid flow rate to a second component of the thermal engine;
an electric motor comprising a first electric motor configured to drive the first lubrication fluid pump using said electrical power from the electric generator, and a second electric motor configured to drive the second lubrication fluid pump using said electrical power from the electric generator; and
a controller in communication with the first electric motor, the second electric motor and a memory device storing instructions, which instructions when executed cause the controller to control the first electric motor to drive the first lubrication fluid pump to produce said first lubrication fluid at said first volumetric fluid flow rate to the first component of the thermal engine, and cause the controller to control the second electric motor to drive the second lubrication fluid pump to produce said second lubrication fluid at said second volumetric fluid flow rate to the second component of the thermal engine.

12. The aircraft of claim 11, wherein the instructions when executed cause the controller to control the first electric motor to drive the first lubrication fluid pump to adjust the first volumetric fluid flow rate to the first component of the thermal engine during operation of the thermal engine, or to control the second electric motor to drive the second lubrication fluid pump to adjust the second volumetric fluid flow rate to the second component of the thermal engine during operation of the thermal engine, or both.

13. The aircraft of claim 11, wherein the thermal engine is a gas turbine engine; and
the lubrication fluid pump further includes a scavenge pump configured to recover said first lubrication fluid from the first component and said second lubrication fluid from the second component of the thermal engine;
the electric motor further includes a first third electric motor configured to drive the scavenge pump using said electrical power from the electric generator; and
the controller is further in communication with the third electric motor and the instructions when executed further cause the controller to control the first third electric motor to drive the scavenge pump to recover said first lubrication fluid from the first component and said second lubrication fluid from the second component of the thermal engine.

14. A method of operating an aircraft hybrid electric propulsion system, comprising:
driving an electric generator to produce electrical power using a thermal engine;
using a controller to control a first electric motor powered by the electrical power to drive a first lubrication fluid pump to produce a first volumetric flow rate of lubrication fluid to a first component of the thermal engine; and
using the controller to control a second electric motor powered by the electrical power to drive a second lubrication fluid pump to produce a second volumetric flow rate of lubrication fluid to a second component of the thermal engine.

15. The method of claim 14, wherein the thermal engine is a gas turbine engine, and the method further comprises:
using the controller to control a third electric motor powered by the electrical power to drive a scavenge pump to recover said lubrication fluid from the first component of the thermal engine, or from the second component of the thermal engine, or both.

16. The method of claim 15, wherein the gas turbine engine has a low speed shaft and a high speed shaft, and the first component is one or more bearings supporting the low speed shaft and the second component is one or more bearings supporting the high speed shaft.

17. The method of claim 14, wherein the first volumetric flow rate of lubrication fluid is different than the second volumetric flow rate of lubrication fluid.

* * * * *